(12) United States Patent
Bajekal et al.

(10) Patent No.: US 10,389,527 B2
(45) Date of Patent: *Aug. 20, 2019

(54) EVENT-DRIVEN, ASSET-CENTRIC KEY MANAGEMENT IN A SMART GRID

(71) Applicant: International Business Machines Corporation, Armonk, NY (US)

(72) Inventors: Sadanand Rajaram Bajekal, Morrisville, TX (US); Jai Singh Arun, Morrisville, NC (US); Michael Delaine Nix, Lake Kiowa, TX (US); Krishna Kishore Yellepeddy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/445,087

(22) Filed: Feb. 28, 2017

(65) Prior Publication Data

US 2017/0244559 A1 Aug. 24, 2017

Related U.S. Application Data

(63) Continuation of application No. 13/972,682, filed on Aug. 21, 2013, now Pat. No. 9,584,314.

(51) Int. Cl.
*H04L 29/06* (2006.01)
*H04L 9/08* (2006.01)

(52) U.S. Cl.
CPC .......... *H04L 9/0861* (2013.01); *H04L 9/0816* (2013.01); *H04L 9/0891* (2013.01); *H04L 9/0894* (2013.01); *Y04S 40/24* (2013.01)

(58) Field of Classification Search
CPC ..... H04L 9/0861; H04L 9/0891; H04L 67/12; H04L 67/18
See application file for complete search history.

(56) References Cited

U.S. PATENT DOCUMENTS 8,924,033 B2 * 12/2014 Goutard ............... H02J 3/06
700/286
2014/0226821 A1 * 8/2014 Kurdziel ............... H04L 9/0836
380/278

* cited by examiner

*Primary Examiner* — Dao Q Ho
(74) *Attorney, Agent, or Firm* — Michael P. O'Keefe; Jeffrey S. LaBaw; David H. Judson

(57) ABSTRACT

A security management system comprises a key management sub-system, an asset/workload management sub-system, and an event management sub-system. The event management sub-system detects events. The asset/workload management sub-system correlates events (irrespective of type) with the assets that generate them, and the key management sub-system uses the event-asset associations determined by the asset/workload management sub-system to automatically orchestrate the necessary key management activities (e.g., key creation, revocation, refresh, etc.) across the impacted components in the information technology and operational realms to ensure data security. In one use case, a security event detected by the event management sub-system triggers one or more actions within the asset/workload management sub-system. Service configuration records are identified from this scan, and assets defined in those records are identified. An event-asset association is then supplied to the key management sub-system, which uses this information to determine a key management operation.

20 Claims, 7 Drawing Sheets

EVENT-DRIVEN, ASSET-CENTRIC KEY MANAGEMENT IN A SMART GRID

BACKGROUND OF THE INVENTION

Technical Field

This disclosure relates generally to securing information in an industrial or other environment (e.g., in a next generation power grid) and, in particular, to improved techniques for key management to protect end-to-end data security in such an environment.

Background of the Related Art

The recent evolution of the smart grid brings about a convergence of electrical power-engineering improvements, networks, and communications and computing technology to transform the one-way power flow value-chain into a fabric of two-way power and information sharing infrastructure. To this end, modern electrical power devices (typically used in transmission and distribution domains) of the power grid today have a collection of sensing, computing, communication and control elements. For example, advanced metering infrastructures are now being put into place to remotely read electrical meters, to manage and control electric substation devices, and to control power switching. The data collected from these field devices often is used for different purposes, such as billing, distribution control, and energy management. The collected data often is aggregated and then analyzed by business analytics and optimization sub-systems to bring new models of pricing operational efficiency and consumer service offerings. In addition, energy-optimization practices, such as electrical demand-response initiatives, need to send commands down to these devices for maintenance, calibration and control. Consequently, these business systems, as well as the field devices, often depend heavily on the integrity of the data collected and the integrity of the control commands sent. In addition, confidentiality of data elements is needed to preserve the behavioral and personally identifiable information (PII) of the customer. Further, many of these field equipment and systems are classified as critical cyber assets, with associated government regulations (e.g., NERC-CIP and FERC) being applicable thereto, making data security even more vital. This data security can be achieved by proper design and deployment of a cryptographic infrastructure to coexist along with the data flow components.

Key management is the management of cryptographic keys for a cryptosystem. Key management typically involves the generation, exchange, storage, use, and replacement of keys. Key management often becomes the most challenging aspect of deploying a crypto infrastructure.

The National Institute of Science and Technology (NIST) has published guidelines (NIST Interagency Report 7628: Guidelines for Smart Grid Cyber Security) to act as a framework and roadmap describing security standards that are applicable (or are likely to be applicable) to the smart grid. This report suggests that a key management scheme be used to protect cryptographic materials, as well as to provide sufficient key diversity. Further, the report suggests that symmetric cipher systems (and thus symmetric keys) be used provided that adequate coordination among the key producer and the key consumers can be enforced.

Despite the importance of data security in this model, there are serious challenges and inhibitions that have prevented end-to-end data security from being implemented effectively in the smart grid. There are numerous reasons why this is the case. Many devices lack the processing power and sufficient random-number generation resources to handle cryptographic key generation. Also, many devices have yet to be enhanced with communication elements that can respond to remote commands, or to collect data and transfer it remotely. While there are new vendors that have begun to provide auxiliary components that can perform such functions and provide basic key storage, these additional components are not supplemented with robust key management schemes and typically do not have connectivity to crypto-key servers, certificate authorities, or other resources (e.g., OCSP servers). Where devices do include native security features, typically the authentication operations are based on asymmetric keys embedded in the devices. While asymmetric cipher systems provide good security, they are computationally-intensive. Moreover, unlike conventional Internet-based secure transactions, the connectivity between smart grid devices and business applications may be long-standing and sometimes persistent, and this necessitates more robust and strategic key management schemes to protect data. Further, third party service providers also may create additional privacy concerns because they provide value-added services (e.g., consumer energy management) that generate detailed information about behavioral patterns and profiles. Another problem is that current practices often expect business application-layer software assets to build data security and key management solutions between just a pair of communicating entities (namely, the endpoint devices and themselves). Data, however, often is shared between and among multiple business systems; thus, care must be taken while provisioning all the keys involved. This requirement becomes especially cost-prohibitive as this overhead is multiplied several times for each security association. Thus, the scalability of key management schemes for data in motion, and data at rest within systems, becomes very difficult and intractable to manage.

Indeed, key management schemes, when implemented, are provisioned in a vacuum, typically within individual vendor-supplied subsystems, with little or no integration across other operational systems. A more robust and integrated solution is necessary.

The subject matter of this disclosure addresses these and other deficiencies of the prior art.

BRIEF SUMMARY

According to this disclosure, cipher key management is provided for an infrastructure (e.g., a smart grid) that is characterized by bi-directional connection of electricity and information flows.

In the approach herein, a security management system comprises a key management sub-system, an asset/workload management sub-system, and an event management sub-system. The event management sub-system detects, among many other events, security events, which are events that arise from security policy enforcement violations. The event management system also responds to other types of events, such as registration events that arise during service establishment, maintenance-related events, and others. The asset/workload management sub-system operates to correlate the event (regardless of type) with the assets that generate them, and the key management sub-system uses the event-asset associations determined by the asset/workload management sub-system to automatically orchestrate the necessary key management activities (e.g., key creation, revocation, refresh, or the like) across the impacted components in the information technology (IT) and operational realms to ensure end-to-end data security.

In a representative use case involving a security compromise, a security event detected by the event management sub-system triggers one or more actions within the asset/workload management sub-system. One or more service configuration records are identified from this scan, and one or more assets (that may have generated the security event) defined in those records are identified (e.g., from an asset database). Based on this information, one or more event-asset associations are identified. As necessary, multiple event-asset associations may be cross-referenced, which facilitates key establishment across multiple and diverse business systems. The key management sub-system uses the event-asset information to automatically configure a key management operation (e.g., generation, submission, retrieval and deletion of cryptographic keys). The management operation is then executed.

In addition to managing keys in response to security events, the techniques may be used to implement key management across multiple other types of use cases in the operating environment.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
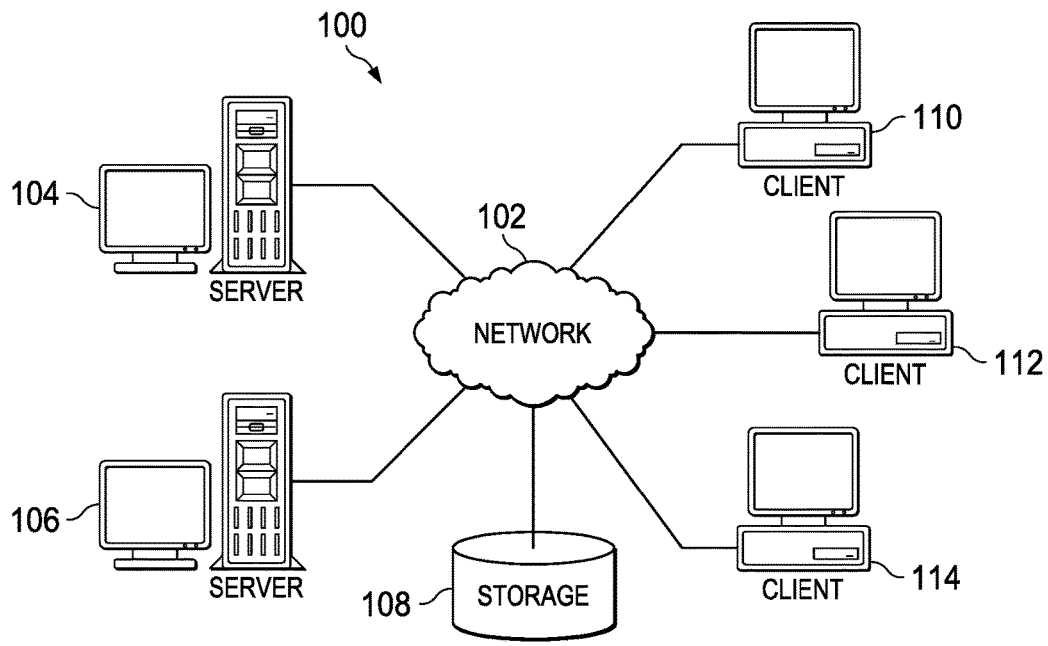
FIG. 1 depicts an exemplary block diagram of a distributed data processing environment in which exemplary aspects of the illustrative embodiments may be implemented.
Figure 2:
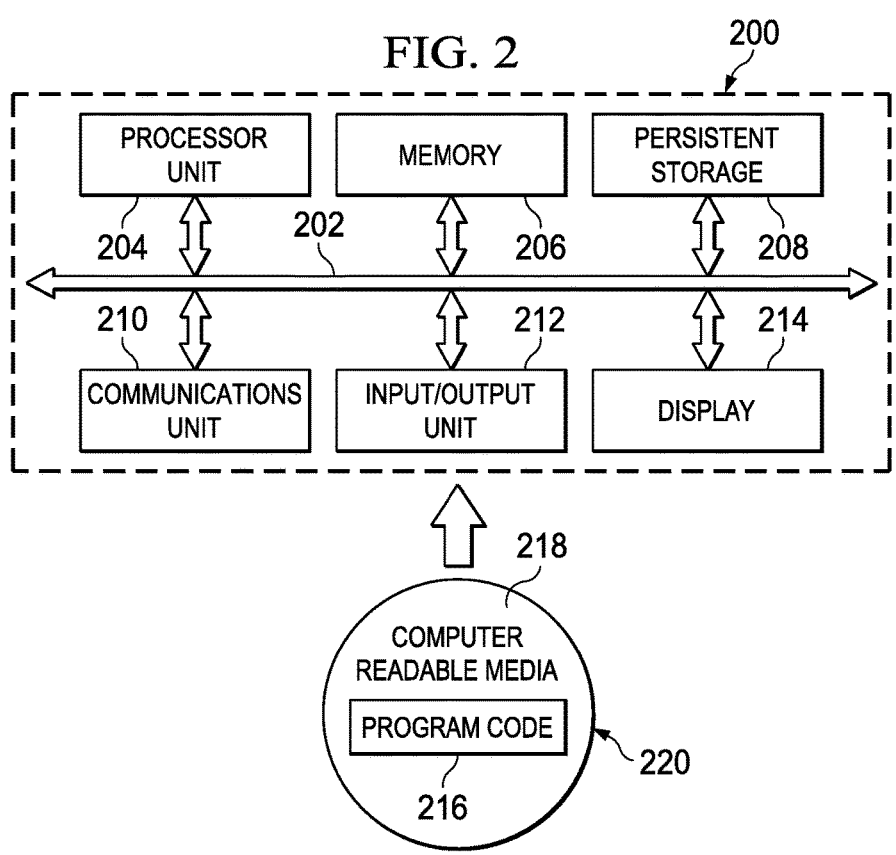
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the subject matter.

Enabling Technologies

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the disclosed subject matter may be written in any combination of one or more programming languages, including an object-oriented programming language such as Java™, Smalltalk, C++, C#, Objective-C, or the like, and conventional procedural programming languages. Program code may be written in interpreted languages, such as Python. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The techniques herein may also be implemented in non-traditional IP networks.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

Certain of the techniques described herein may operate in conjunction within the standard client-server paradigm such as illustrated in FIG. 1 in which client machines communicate with an Internet-accessible server or portal executing on a set of one or more machines. End users operate Internet-connectable devices (e.g., desktop computers, notebook computers, Internet-enabled mobile devices, or the like) that are capable of accessing and interacting with the portal. A client may interact with a server autonomously. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, and UDDI, among others. Information regarding SOAP, WSDL and UDDI is available from the World Wide Web Consortium (W3C), which is responsible for developing and maintaining these standards; further information regarding HTTP and XML is available from Internet Engineering Task Force (IETF). Familiarity with these standards is presumed.

By way of further background, mobile device technologies also are well-known. A mobile device is a smartphone or tablet, an Internet-connected appliance or device, or the like. A device of this type typically comprises a CPU, computer memory, such as RAM, and a data store. The device software includes operating system, and generic support applications and utilities. A device may include a separate graphics processing unit (GPU). A touch-sensing device or interface, such as a touch screen, may be configured to receive input from a user's touch and to send this information to processor. Other input/output devices include software-based keyboards, cameras, microphones, and the like. More generally, a mobile device is any wireless client device, e.g., a smart phone, a tablet, an intelligent appliance, a pager, a personal digital assistant (PDA, e.g., with GPRS NIC), a mobile computer with a smartphone client, or the like. Typical wireless protocols are: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP. A mobile device may be a 3G- (or next generation) compliant device that includes a subscriber identity module (SIM), which is a smart card that carries subscriber-specific information, mobile equipment (e.g., radio and associated signal processing devices), a man-machine interface (MMI), and one or more interfaces to external devices. The mobile device may be an intelligent appliance.

The mobile device typically also has support for wireless local area network (WLAN) technologies, such as Wi-Fi, home area network (HAN) technologies, such as Zigbee, and the like.

Smart Grid

The smart grid is the next generation power grid. It is based on bi-directional (two-way) connection of electricity and information flows. The smart grid combines the legacy electricity grid with contemporary communications and computing technologies. The smart grid delivers electricity between generators and end users (e.g., industrial, commercial and residential). The approach uses bi-directional information flow to control intelligent devices to reduce energy consumption and to balance electricity supply and demand. As is well-known, the Advanced Metering Infrastructure (AMI) is an important aspect of the smart grid; an AMI deployment relies upon a smart meter, which is an end user device that collects data and communicates with a service provider in the smart grid.

Figure 3:
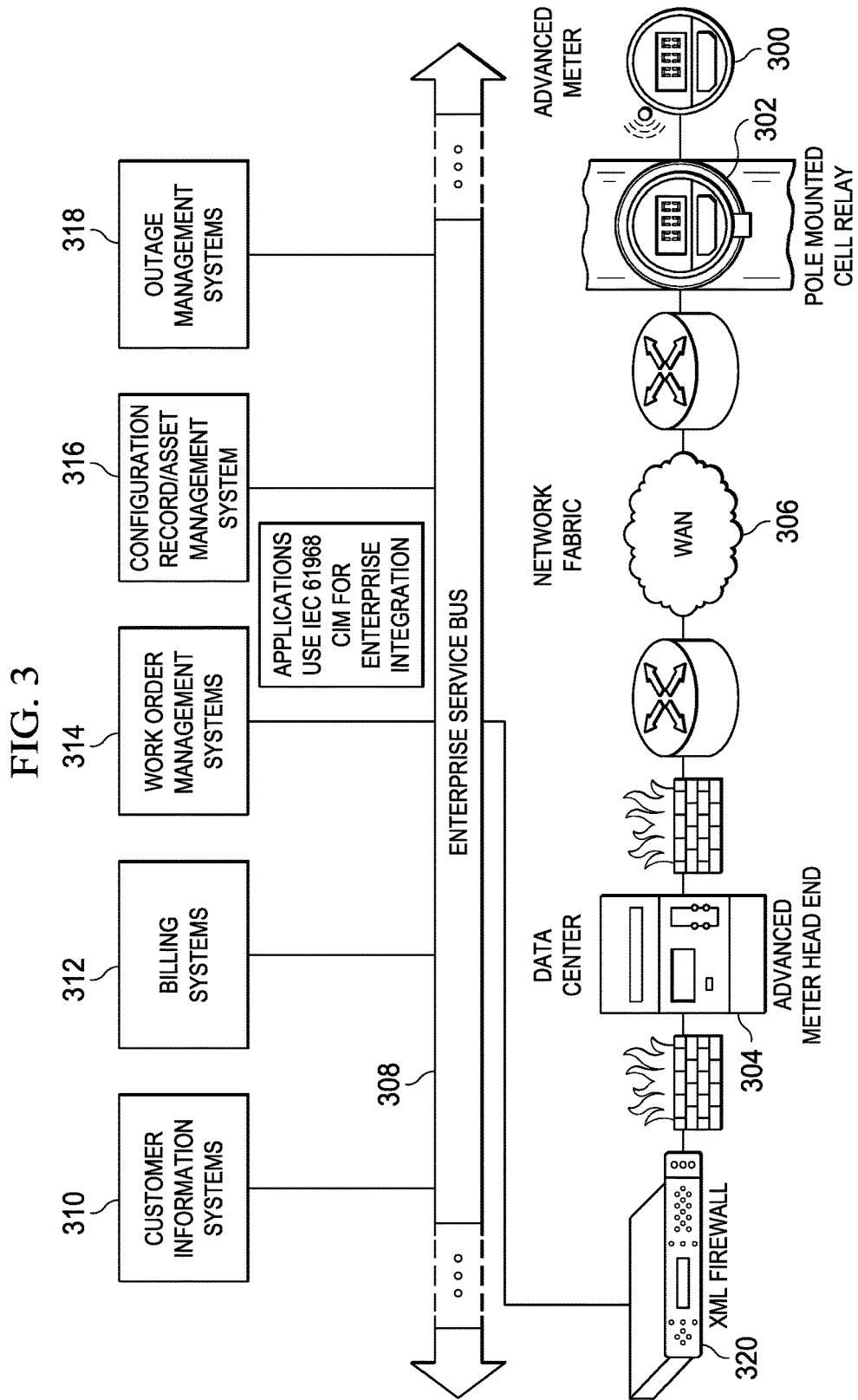
FIG. 3 illustrates an exemplary Advanced Metering Infrastructure (AMI) architecture in which the disclosed subject matter may be implemented.

FIG. 3 illustrates a representative AMI deployment scenario. Typically, an AMI deployment comprises a smart meter, its associated head end, and intermediary devices and networks. In this example, the smart meter 300 is located at an end use location. Typically, the smart meter 300 communicates over a wireless network (e.g., an 802.11e-based network) to a pole-mounted cell relay 302 or other intermediary. The relay 302 is coupled to an advanced meter head-end 304 located in a data center. A wide area network (WAN) fabric 306 interconnects the relay to the head-end. Typically, a meter vendor provides all of the AMI technology from the meter head-end 304 down to the meter 300. The AMI deployment is coupled to an enterprise service bus 308 as the pathway for transactions with one or more applications. The enterprise service bus (ESB) 308 is modeled using the Common Information Model (CIM). This standard has been officially adopted by the International Electrotechnical Commission (IEC), as Standards IEC-61968 and IEC-61970. CIM facilitates information exchange about the configuration and status of an electrical network to be exchanged between application software. The standard is maintained as a UML model that defines a common vocabulary and basic ontology for aspects of the electric power industry. The CIM in particular can be used to derive design artifacts (e.g., XML Schema, RDF Schema) as needed for the integration of related application software. The IEC CIM format has been adopted by the major energy management software vendors to allow data exchange between their applications, independent of internal software architecture or operating platform differences. A similar hierarchical model exists for distribution networks and that addresses data extraction from electrical sub-stations. In the example deployment shown in FIG. 3, the AMI deployment is coupled via the ESB 308 to applications that use IEC 61968 CIM for enterprise integration.

As also seen in FIG. 3, and without limitation, typically the application software comprises customer information systems 310, billing systems 312, work order management systems 314, configuration record/asset management systems 316, and outage management systems 318. One or more of these application software systems may be co-located or remote from one another, combined with one another, executed in a cloud-based environment, or the like. Each of these systems may be supplied by different vendors. A firewall 320 may be used to protect the enterprise service bus 308 and the associated application software. The firewall may be supported within a Service Oriented Architecture (SOA) middleware appliance, such as IBM® DataPower®.

Generalizing, the entities (e.g., devices, service applications, and the like) in the operating environment may also be considered "nodes" in a data and power delivery network. In the smart grid embodiment, the nodes are the meters, meter head-end, service applications, and the like, that, together, facilitate delivery of electricity (e.g., over a legacy delivery system) under the control of the two-way information flows as described. Typically, a given pair of nodes (a "segment") may have a security association associated therewith.

Figure 4:
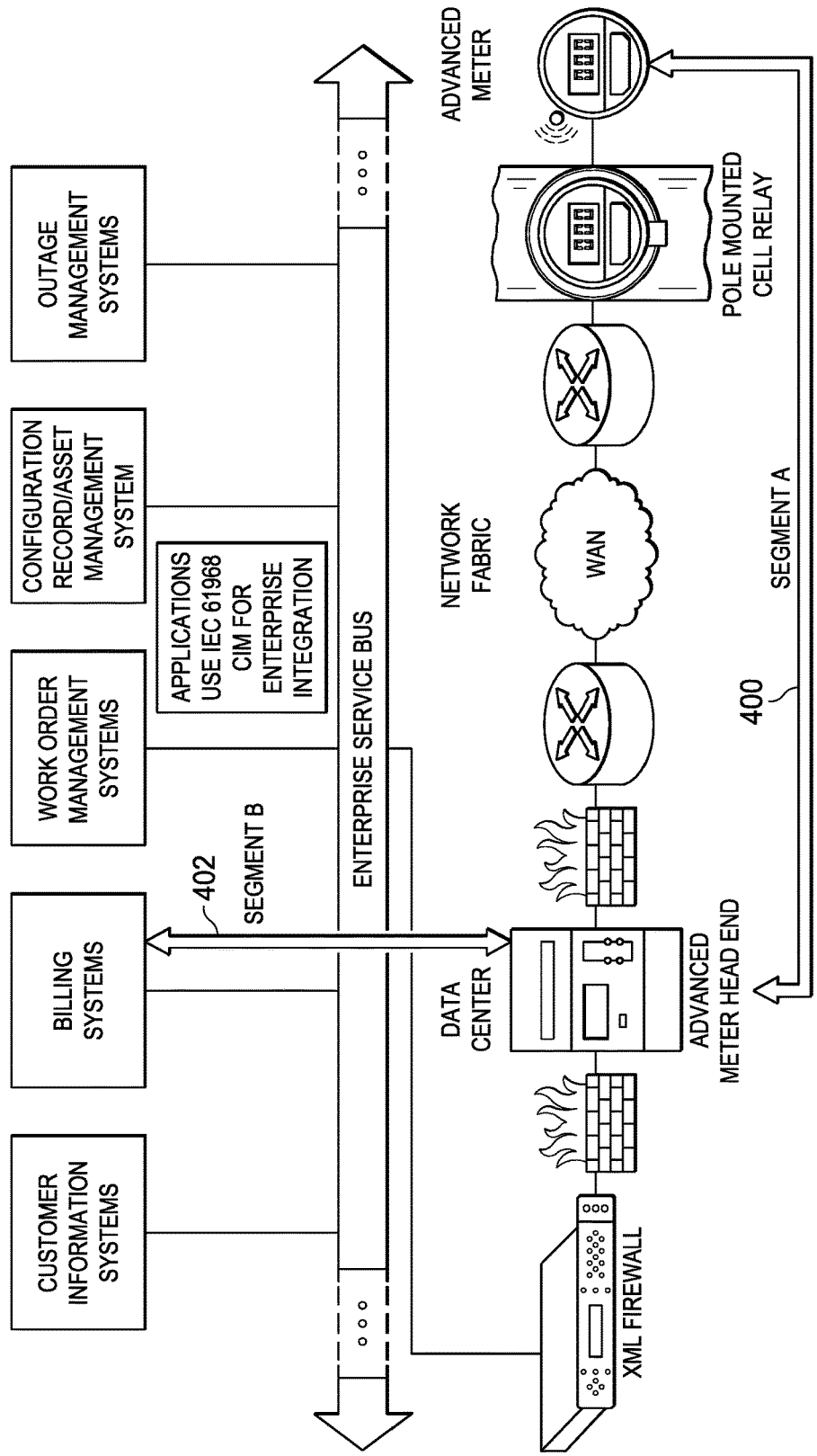
FIG. 4 illustrates an exemplary set of security associations in the AMI architecture.

Referring now to FIG. 4, an exemplary set of security associations in the AMI architecture is shown. These security associations are merely representative. In this example scenario, a first segment 400 (segment A) represents a first security association defined between the head-end meter at the data center and the smart meter that is located remotely (typically, at the end user location). A second segment 402 (segment B) represents a distinct security association between the head end meter and the application layers, which layers interact with the AMI using one or more interfaces offered by the head end. Typically, the meter vendor takes ownership of providing a solution for the security requirements of segment A but not necessarily for segment B (the data traversing between the applications and the meter head-end). In either segment, however, there is a need for key management to ensure that data security is enforced. The type of segmented (disjoint) key management approach shown in FIG. 4 is difficult to manage (especially where multiple different toolsets are used) and thus inhibits end-to-end data security from scaling across multiple and diverse business systems.

As noted above, the subject disclosure that is now described addresses these deficiencies.

Event-driven, Asset-centric Key Management

Figure 5:
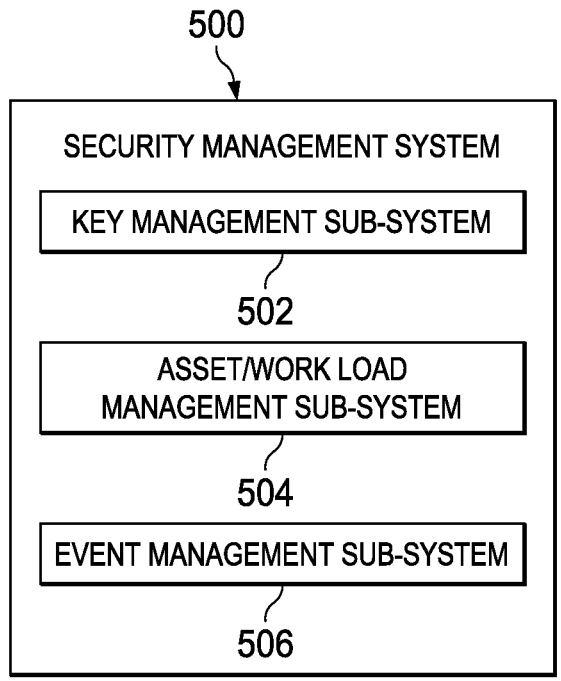
FIG. 5 is a block diagram of a security management system according to this disclosure.

With the above as background, the following describes an inventive security management system. As seen in FIG. 5, at a high level the security management system 500 comprises three (3) primary functional components: a key management sub-system 502, an asset/workload management sub-system 504, and an event management sub-system 506. The terms "system" and/or "sub-system" should be broadly construed, and these terms may be used interchangeably with "modules," "functions" and "components." The functionalities described may exist in a standalone manner, or they may be integrated in whole or in part. They may be co-located, or remote from one another, in whole or in part. They may be unitary, or they may comprise cooperating parts. They may be implemented in software, firmware, hardware and software, or the like. Typically, a system or sub-system comprises computer system-executable instructions, such as program modules, being executed by a computer system. Generally, program modules may include routines, programs, objects, components, logic, data structures, and so on that perform particular tasks or implement particular abstract data types. The functions may be practiced in distributed cloud computing environments where tasks are performed by remote processing devices that are linked through a communications network.

In one embodiment, the key management sub-system is implemented as a key management server that is secured within a secure, trusted enterprise network zone. A representative key management server that may be used for this purpose is the IBM® Tivoli® Key Lifecycle Manager (TKLM). This server typically executes in an application server/database server operating environment, such as on IBM WebSphere® Application Server, and DB2®.

In one embodiment, the asset management and workload management sub-system is implemented by an enterprise asset manager server. A representative server of this type is the IBM® Tivoli® Maximo Enterprise Asset Manager For Utilities. This server also may execute in an application server/database server operating environment, such as described above.

In one embodiment, the event management sub-system provides an intelligent infrastructure to notify subscribers, possibly with enriched, correlated events of interest and/or concern. A representative server of this type is the IBM® Tivoli® Netcool Omnibus product. This server also may execute in an application server/database server operating environment, such as described above.

The above-identified commercial products are identified solely for example purposes and not by way of limitation. Any product, service, program, process, or function may be substituted.

As will be described in more detail below, within the context of this disclosure, the event management sub-system 506 need not always play a role in every use case involving key management, although typically it comes into play in situations when events involving potential key compromises occur. For convenience, and not by way of limitation, an event detected by the event management sub-system 506 is sometimes referred to herein as a "security event" to distinguish it from, for example, other types of events, such as registration events, maintenance-related events, and the like, that may also trigger actions within the asset/workload management sub-system 504. An example of the latter type of event is establishment of a service relationship between or among various components that, in turn, requires the establishment of keys to enforce data security end-to-end. A particular example of this service relationship establishment (described below) is a meter on initial deployment that registers through its head-end system, thereby publishing a "registration event" that triggers one or more actions within the asset/workload management sub-system. There may be many other use cases that are triggered by other types of events that have the effect of triggering actions that involve key associations and their management. Thus, as used herein, the term "event" should be broadly construed to refer to security-related events, registration-related events, maintenance-related events, and others.

Figure 6:
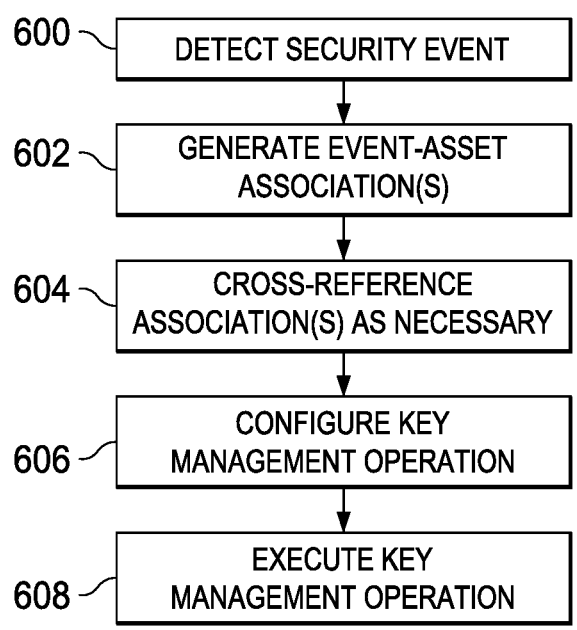
FIG. 6 illustrates a process flow of how the component sub-systems of the security management system interact with one another in one use case of the disclosed subject matter involving a security event.

FIG. 6 illustrates one use case involving detection of a security event by the event management sub-system. As described above, this is just one use case for the system, and it should not be taken by way of limitation. In this example use case, the event management sub-system 506 detects security events, the asset/workload management sub-system 504 correlates the security events with the assets that generate them, and the key management sub-system 502 uses the event-asset associations determined by the asset/workload management sub-system to automatically orchestrate the necessary key management activities (e.g., key creation, revocation, refresh, or the like) across the impacted components in the information technology (IT) and operational realms to ensure end-to-end data security. In a representative method as illustrated by the process flow in FIG. 6, a security event is detected by the event management sub-system. This is step 600. In one example, the security event arises as an asynchronous event (e.g., a security incident). The security event detection triggers one or more actions within the asset/workload management sub-system. In particular, one or more service configuration records are identified from this scan, and one or more assets (that may have generated the security event) defined in those records are then identified (e.g., from an asset database). These operations generate one or more event-asset association(s). This is step 602. At step 604, as necessary multiple event-asset associations are cross-referenced (sometimes referred to as "linked"). As will be seen, such cross-referencing provides a way for the security management system to perform key establishment across multiple and diverse business systems. Step 604 may not be required, depending on the nature and type of event. At step 606, the key management sub-system uses the event-asset information to configure one or more key management operations (e.g., generation, submission, retrieval and deletion of cryptographic keys). At step 608, the key management operation is executed. Although not intended to be limited, preferably the operations carried out in FIG. 6 occur automatically and autonomously in an AMI deployment that has been configured to use the security management system.

Figure 7:
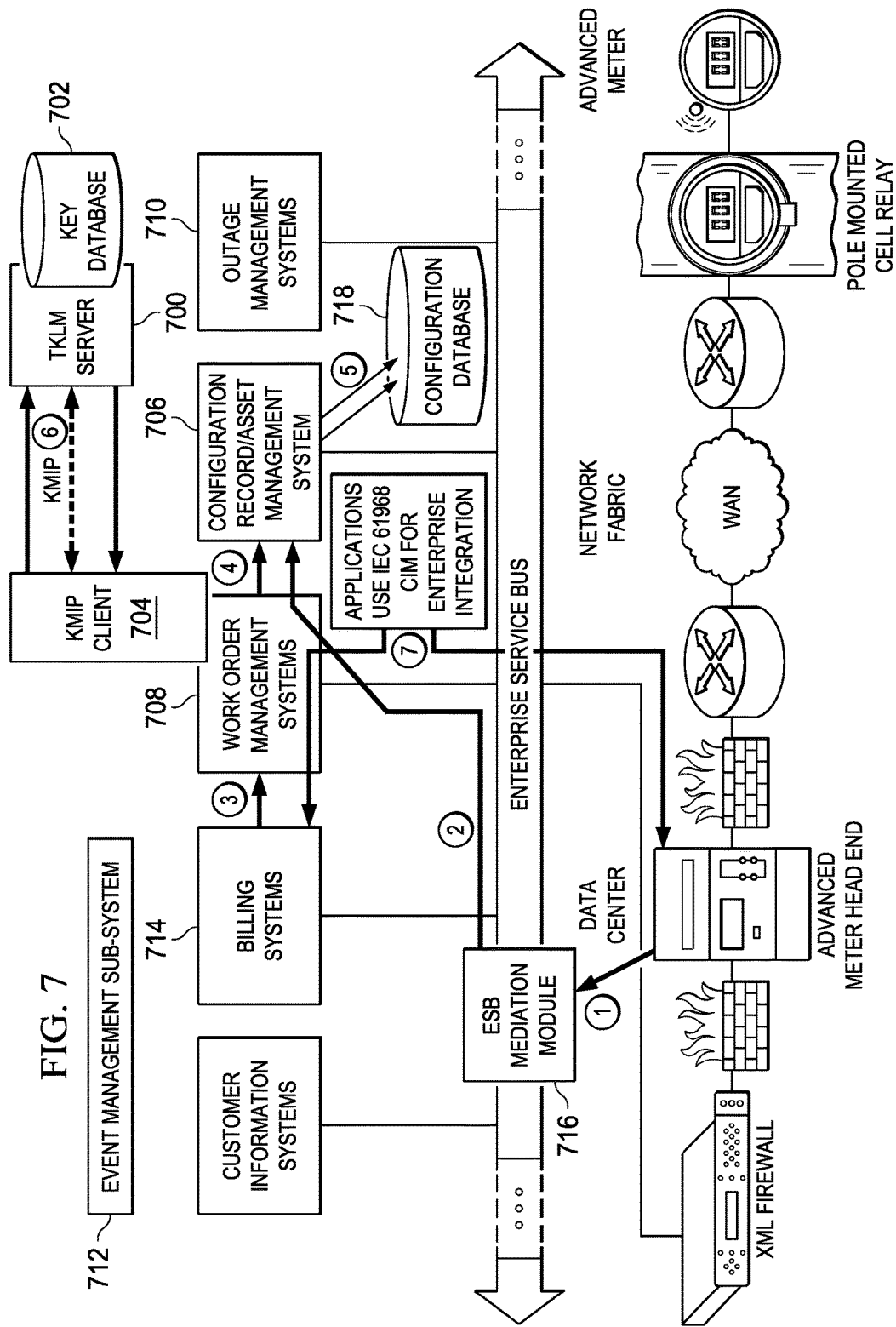
FIG. 7 illustrates the AMI architecture of FIG. 3 after it has been modified to include the security management system of this disclosure.

FIG. 7 illustrates the enterprise/AMI deployment architecture of FIG. 3 after it has been modified to include the security management system of this disclosure. In this embodiment, the key management sub-system comprising a cooperating set of components, namely, a TKLM server 700, a key store 702 having a database of keys, and a "KMIP" client 704. KMIP refers to the Key Management Interoperability Protocol (KMIP), which is a new standard for key management sponsored by the Organization for the Advancement of Structured Information Standards (OASIS). KMIP is designed as a comprehensive protocol for communication between enterprise key management servers and cryptographic clients (e.g., from a simple automated device to a sophisticated data storage system). By consolidating key management in a single key management system that is KMIP-compliant, an enterprise can reduce its operational and infrastructure costs while ensuring appropriate operational controls and governance of security policy. KMIP treats cryptographic clients uniformly and as entities that are intelligent and themselves capable of specifying cryptographic information, such as correct key sizes, encryption algorithms, and the like. Key lifecycle operations supported by the protocol include generation, submission, retrieval and deletion of cryptographic keys.

Referring back to FIG. 7, the TKLM server 700 and associated key store 702 provide an enterprise key management solution enables KMIP communication with KMIP clients (such as client 704) for key management operations on cryptographic material. The material includes, without limitation, symmetric and asymmetric keys, certificates, and templates used to create and control their use. In operation, the key management server 700 listens for connection requests from KMIP clients that send requests to locate, store, and manage cryptographic material on the server. Using the server 700, the enterprise manages the lifecycle of the keys and certificates. Thus, for example, among other functions, the server enables basic key serving, such as definition and serving of keys, definition of keys or groups of keys that can be associated with a device (e.g., disk systems, drives, smart meters, mobile devices, etc.), and the like, as well as auditing functions. In a typical scenario, the server supports KMIP secret data and symmetric key interoperability profiles for KMIP server and client interactions. The server provides KMIP information, such as whether KMIP ports and timeout settings are configured, current KMIP certificate (indicating which certificate is in use for secure server or server/client communication), whether SSL/KMIP or SSL is specified for secure communication, and so forth. The server may also provide updating KMIP attributes for keys and certificates. The server 700 serves keys at the time of use to allow for centralized storage of key material in a secure location. It also includes a graphical user interface (or, in the alternative, a command line or other programmatic interface) by which administrators (or other permitted entities) centrally create, import, distribute, back up, archive and manage the lifecycle of keys and certificates. Using the interface, administrators can group devices into separate domains, defines roles and permissions, and the like. By default, typically, groups of devices only have access to encryption keys defined within their group. These role-based access control features enable separation of duties, mapping of permissions for what actions against which objects, and enforcement of data isolation and security in a multi-tenancy environment. This also enhances security of sensitive key management operations. All KMIP clients transacting business with TKLM server 700 are subject to successful trust establishment with mutual authentication before any key transactions begin with the TKLM server.

Figure 8:
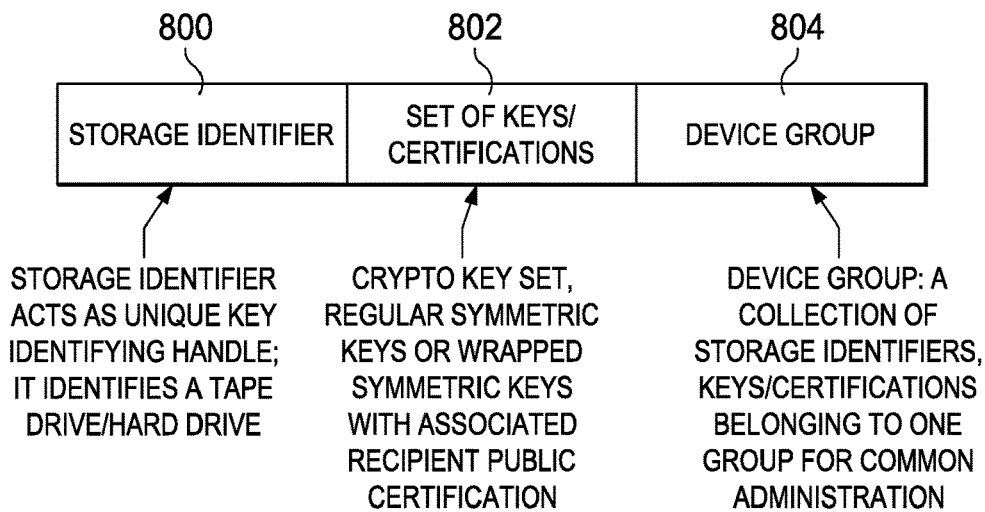
FIG. 8 illustrates how keys may be structured and organized by a key management sub-system of the security management system.

FIG. 8 illustrates how keys may be structured and organized by the key management sub-system of the security management system. Internally, the keys in the TKLM server 700 are stored in a protected data store 702. TKLM recognizes crypto keys using just a Device Storage identifier, which typically is a 12-24 digit alphanumeric serial number. Keys or certificates are the entities served to clients. Symmetric keys either can be defined for one-to-one communications between just two entities or for a larger group by using a notion of device groups (which represent a group of known storage identifiers) that can share a group of keys. Each device group can have separate administrators with specific privileges. In FIG. 8, the Storage ID 800 acts a unique key identifying handle. The crypto key set 802 comprises the symmetric keys (or wrapped symmetric keys) with the associated recipient public key certificate. The device group 804 represents a collection of storage IDs, and their associated keys/certificates that belong to one group for common administration.

In operation, the TKLM server 700 assists encryption-enabled devices in generating, protecting, storing, and maintaining encryption keys that are used to encrypt and decrypt information that is written to and read from devices. The key management server 700 acts as a background process waiting for key generation or key retrieval requests sent to it through a TCP/IP communication path between itself and various devices, such as some other management system, a device driver, a disk controller, a network switch, a smart meter, and others. These are merely representative cryptographic client devices. When a client writes encrypted data, it first requests an encryption key from the key management server. KMIP standardizes communication between cryptographic clients that need to consume keys and the key management systems that create and manage those keys. It is a low-level protocol that is used to request and deliver keys between any key manager and any cryptographic client. KMIP uses the key lifecycle specified in NIST SP800-57 to define attributes related to key states. Network security mechanisms, such as SSL/TLS and HTTPS, are used to establish authenticated communication between the key management system and the cryptographic client.

Referring back to FIG. 7, as noted above the security management solution of this disclosure also leverages an asset management sub-system. This portion of the solution may utilize the existing asset manager 706 in the enterprise, or it may be a separate component (or a component integrated with the key management or event management sub-systems, as described above). The asset management component provides the ability to create an authoritative source of record of all the assets owned (or managed) by the grid utility. The asset manager preferably includes or has associated therewith a work order component 708 that is operative to identify tools and/or personnel for a particular task, as well as estimates for time frames, financial costs, and the like. The work order component 708 includes a task dispatcher component that is controlled by an enterprise business process workflow. For example, and without limitation, the work order component may respond to a crew dispatch request that originates from an outage management system 710. The work order component may also orchestrate automated tasks associated with the data center.

As also seen in FIG. 7, the security management solution of this disclosure leverages the event management sub-system 712. Preferably, and as noted above, this sub-system is a real-time event disposition system that has the ability to capture events from diverse sources, to correlate them with a rich abstraction of context around the event, and to take actionable step(s), such as incident management or trouble ticket reporting. As noted above and as will be described in more detail below, the event management sub-system 712 typically inter-operates with the other components of the solution when security events involving potential key compromises occur. As also noted, the event management sub-system 712 is not required to play any active role with respect to other types of events, e.g., in the initial configuration of keys during service relationship establishment, as is now described by a second use case.

In particular, and with continued reference to FIG. 7, another example use case is now described. In this example scenario, a business application (such as a billing application in the billing system 714) needs to establish connection with some operational equipment (such as the smart meter) and then reads its data for billing settlement. As per security policies, it is assumed that certain elements of the data needs to be cryptographically signed (for establishing integrity), as well as encrypted (to protect user privacy concerns). This requires that keys between the billing application and the meter head-end, as well as between the head-end and the smart meter itself, have to be established and shared to ensure that data security is enforced end-to-end. It is assumed that the asset management system 706 maintains a repository of all the IT and operational assets of the energy/utility company. This repository is maintained in an XML manifestation of the CIM (Common Information Model)-UML model, with defined relationships and associations between devices and applications. It is further assumed that the grid applications interpreting XML data have knowledge of the syntax and semantics to be used; typically, this is accomplished using XML Schema, which provides constraints on the structure and contents of the XML document. Extensions to XML Schema are made to allow for device and application security characteristics to be introduced and embedded within the semantics. One of these extensions (an extended attribute) is the Storage ID of the cryptographic key(s) each node (i.e. meter device, head-end, application, or the like) is to be associated with. Preferably, the security attributes in the XML repository do not themselves contain keys.

With the above assumptions, FIG. 7 illustrates one possible way of managing this relationship. At step (1), the smart meter on initial deployment registers through its head-end system, which publishes the meter registration event. This event (which is an example of an event that is not a security event identified by the event management sub-system) triggers an enterprise service bus (ESB) mediation module 716, which at step (2) registers the smart meter with the asset manager 706. At step (3), the billing application in the billing system 714 expresses its need to connect with the smart meter by sending a request to the work order component 708. The work order component 708 recognizes that the billing application cannot be connected directly to the smart meter but must also connect through the head-end; the work order component initiates the right connectivity among the three components (billing application, head-end and smart meter) by sending a request to the asset manager 706 for an appropriate configuration record. This is step (4). Steps (3)-(4) may occur asynchronously with respect to steps (1)-(2). The asset manager 706 has an associated configuration database 718 in which the configurations are stored. Within database 718, extensions to the IEC CIM schema allow the meter to be associated with the head-end, and the billing application to be associated with the head-end. Preferably, these associations are enabled by cross-referencing such relationship dependencies. In this manner, the asset manager component enables the necessary security associations to be identified and linked as necessary.

As noted above, according to this disclosure, the work order (or some others) component 708 has the KMIP client 704 associated therewith. As noted, the device-to-work order component communication paths are mutually authenticated, as is the communication path between the client 704 and the TKLM server 700. Although not required, the work order component 708 and the TKLM server both may reside in the same trusted, restricted network that is secured with intrusion protection appliances.

Key establishment may then occur as follows. By convention, when appropriate to signify both segments, the term "tuple" refers to both (e.g., segment A being the "application to head-end" association, and segment B being the "head-end to the meter" association). In this example, the segment A path (application to head-end) cross-references segment A (the head-end to the meter). At step (6), the work order component 708 through its associated KMIP client 704 initiates a key establishment sequence. Similarly, the head-end to meter tuple follows in a like manner. In particular, the work order component 708 generates a handle for the two segments to be used as a Storage ID; the component 708 then submits this Storage ID to the TKLM server, requesting a symmetric key be generated against this handle. The KMIP protocol securely exchanges the key with the work order component, which enters the handle and the respective key in the configuration database 718 with respect to the billing application and the associated meter head-end. As noted above, preferably the actual key does not reside in the configuration database. In the preferred embodiment, the actual key is only available in the TKLM server key database 702, which is secured by the TKLM server 700. The TKLM server associates this key with the handle and returns the key to the KMIP client during the operation. At step (7), the key is returned, e.g., using Secure Web Services or other transport, to the billing application, as well as to the meter head-end (or other ESB data security enforcement point) to enable data fields for the meter and the billing application to be digitally-signed (for data integrity) and/or encrypted (for data privacy). The key returned may also be a key (a "wrapped key") that is wrapped with a pre-shared asymmetric key-encrypting key established by the TKLM server.

Figure 9:
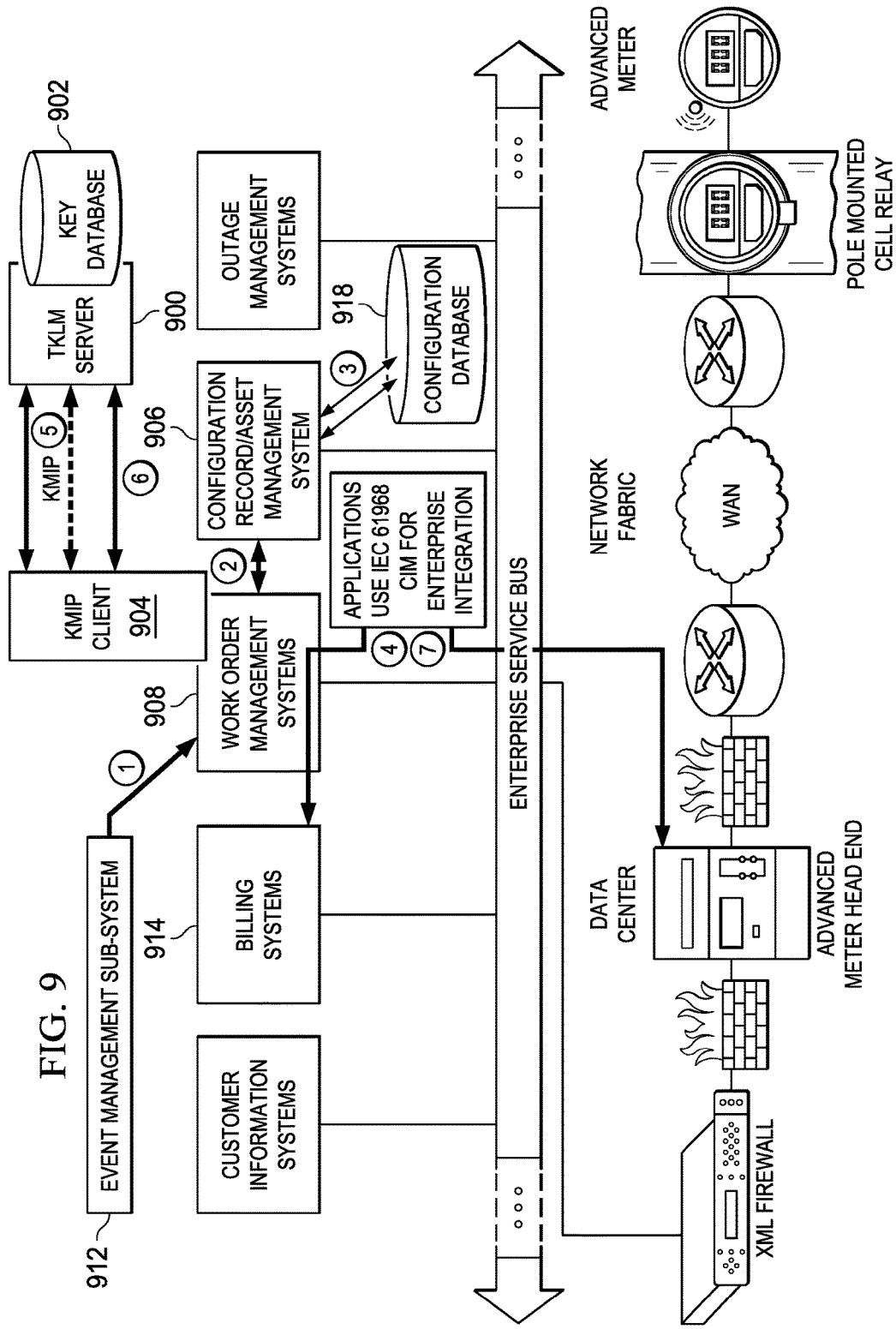
FIG. 9 illustrates how security management system may be used to provide automated key revocation/refresh upon a security compromise.

FIG. 9 illustrates how this security management system handles automated key revocation/refresh upon a security compromise. This is a more specific example of the operations shown in the process flow of FIG. 6. In this example, a security event, such as equipment (meter) tampering is detected. The event management sub-system 912 processes this real-time event. The event may also be identified by any meter vendor event management functionality (if present). As seen in FIG. 9, at step (1) the meter security compromise incident is then submitted (as an action item) to the work order management system 908. The action item typically includes details which meter(s) are affected. At step (2), the work order component 908 queries the asset management system 906 to retrieve the CIM information about each meter, thereby obtaining the key handle of the meter(s) affected.

During this interaction, the asset management system 906 may query its associated configuration database 918 (step (3)). At step (4), and for each affected endpoint (e.g., the meter head-end, and the smart meter) and for each associated business application (e.g., billing application 914), the work order management component 908 sends a key revocation command. The following describes the key revocation and refresh for segment A (the "application to head-end" association). In particular, after the command is acknowledged as being successful, the work order management component 908 continues at step (5) using the appropriate handles to cause its associated KMIP client 904 to interact with the TKLM server 900 and thereby delete the key entry from the TKLM database 902. At step (6), the work order management component 908 uses the handles and its KMIP client 904 to request the TKLM server to generate a new key. At step (7), the new key is securely refreshed in the business application (the billing system) and the affected endpoint (the head-end) to complete the key revocation and refresh process that was triggered initially by the monitored security event. Similar steps are used to refresh the segment B tuple (the "head-end to the meter" association).

Figure 10:
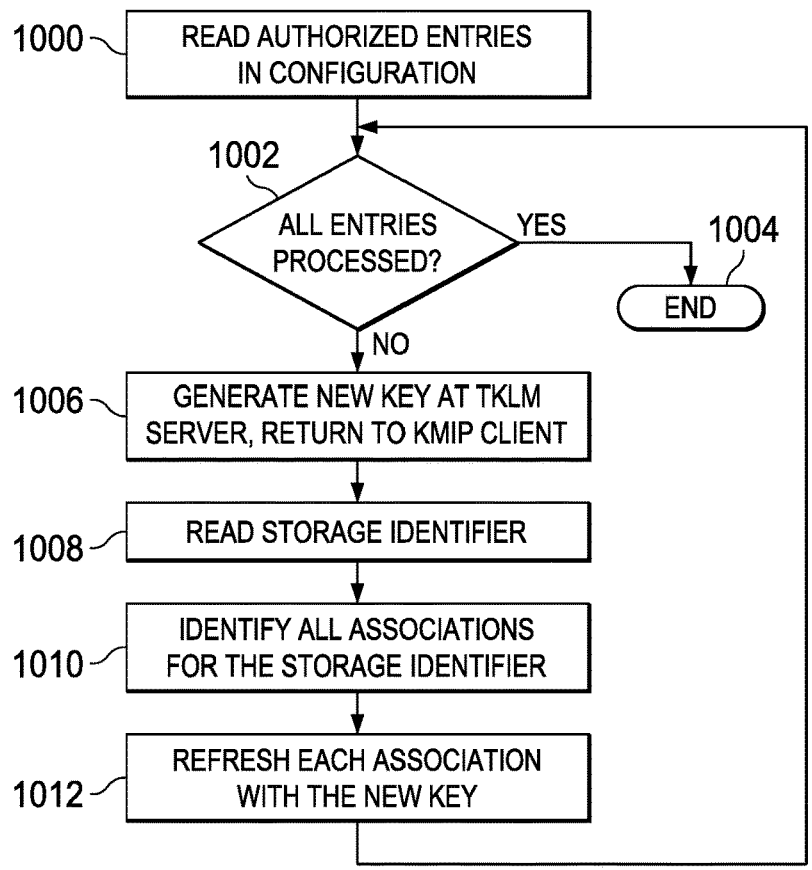
FIG. 10 is a process flow illustrating an algorithm for key revocation and refresh.

As noted above, other types of events that have a bearing on security may also be managed by the techniques of this disclosure. Another example scenario involves conditioned monitoring for periodic key refresh. In this example use case, a timed event within the work order management system occurs, say, event 90-120 days, e.g., to signify that it is time for a routine maintenance task. In this example, the task is to change the cryptographic keys for one or more cyber-sensitive assets, just like one changes passwords to identity credentials every so often. This event typically is self-triggered, but it may also be identified in some other manner (even by the event management sub-system); in response, the work order management component queries the asset management component (and its configuration database as described above) for all the impacted event-asset associations. The impacted keys are then refreshed in the manner described above. A representative algorithm for this operation is shown in FIG. 10. This algorithm typically executes in the work order component, using its associated KMIP client, as also described above. The routine begins at step 1000 to read all authorized entries in the work order management configuration repository. At step 1002, a test is performed to determine whether all entries have been processed; if so, the routine ends at step 1004. If there is a next entry to process, the routine continues. At step 1006, and for the next entry, the routine causes the KMIP client to transact with the TKLM server to generate a new key, which is then returned. At step 1008, the routine reads the Storage ID of the selected entity. At step 1010, the routine identifies all associated applications and endpoint entities using the same Storage ID. At step 1012, the routine provides the new key for the associated entities. Control is then returned to step 1002.

The subject matter herein provides significant advantages. The approach provides a unified solution for cryptographic key management across multiple and disparate technologies, products and business systems that comprise the smart grid. Key management is enabled in a well-rounded, holistic manner to provide for coordinated communication and thus timely corrective security measures to be enacted. The approach minimizes the impact to sensitive data of a security compromise, thereby providing significant protection for critical cyber assets. The workload-based approach described automatically orchestrates key creation, key revocation and key refresh directives across associated components in the IT and operational realms of the smart grid, even if the components are unrelated to one another, sourced from disparate vendors, or would not otherwise inter-operate.

The approach ensures that cryptographic keys are always secure, whether in transit or at rest. By associating the cryptographic key management lifecycle with asset management, the approach ensures that the utility field equipment can enforce data security without the usual conundrum of managing potentially thousands of keys for a large number of assets. In the event of keys being compromised, the security management solution provides pro-active action to revoke and refresh the keys. The approach also enables revocation/refreshing to be part of a regular maintenance cycle. The techniques here also enable condition-based monitoring of cryptographic keys for a cyber-asset connected to some operational gear. The approach also enables keys to be dynamically refreshed only as needed, e.g., for only those portions of the asset/configuration database that are impacted by a security event, a routine maintenance requirement, or the like.

In a preferred embodiment, the cryptographic keys are symmetric keys, although this is not a requirement, as the key management techniques may be applied for any cryptographic materials or operations.

As has been described, the functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols.

Still more generally, the subject matter described herein can take the form of an entirely hardware embodiment, an entirely software embodiment or an embodiment containing both hardware and software elements. In a preferred embodiment, the security management solution (or any component thereof) is implemented in software, which includes but is not limited to firmware, resident software, microcode, and the like. Furthermore, the described functions can take the form of a computer program product accessible from a computer-usable or computer-readable non-transitory medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Storage devices may include removable media, such as SD cards. The computer-readable medium is a tangible, non-transitory item. Any of these devices can be used to store information protected by the system.

Any cloud datacenter resource may host a security management solution component as described herein.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the security management solution components are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

Further, the functionality provided herein may be implemented as an adjunct or extension to an existing cloud compute management solution.

The techniques described herein may be used in virtual client-server environments.

The techniques herein may be used in other than the energy and utility (smart grid) industries, as they may be applied to other fields such as logistics, natural resource monitoring/management, smart city, telecommunications and health care, in the chemical and petroleum industries, and many more, wherein cryptographic keys need to be managed across networks, communications and computing technologies.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Having described our invention, what we claim is as follows.

The invention claimed is:

1. A method of key management in a network comprising a plurality of nodes, comprising:
    responsive to occurrence of an event, wherein the event is associated with a maintenance task in the network, generating a set of event-asset associations by identifying one or more configuration records, and identifying one or more assets defined in the identified configuration records that may have generated the event, wherein the one or more assets are identified by examining a configuration of assets in an asset database;
    using the set of event-asset associations so generated, cross-referencing a first event-asset association that is associated with a first system, with a second event-asset association that is associated with a second system, the second system being distinct from the first system, to thereby generate cross-referenced event-asset associations for the first and second systems, wherein cross-referencing enables a key management operation to be carried out across the distinct first and second systems collectively as if the first and second systems are integrated with one another;
    based at least on the cross-referenced event-asset associations, deriving a key handle;
    using the key handle to initiate the key management operation; and
    performing the key management operation for each of the first and second systems as a response to the event.

2. The method as described in claim 1 wherein the first and second systems are first and second application software systems.

3. The method as described in claim 2 wherein each of the first and second application software systems are managed by distinct entities.

4. The method as described in claim 1 wherein the key management operation is one of: generation, establishment, retrieval, revocation and refresh.

5. The method as described in claim 1 wherein the event is one of: an event triggered upon compromise of an entity, and an event triggered upon establishment of a service connection from an entity.

6. The method as described in claim 1 wherein the event is a timed event associated with the maintenance task in the network.

7. The method as described in claim 1 wherein the key management operation is initiated using a key management protocol.

8. Apparatus, comprising:
    a processor;
    computer memory holding computer program instructions executed by the processor to perform key management in a network comprising a plurality of nodes, the computer program instructions performing a set of operations comprising:
        responsive to occurrence of an event, wherein the event is associated with a maintenance task in the network, generating a set of event-asset associations by identifying one or more configuration records, and identifying one or more assets defined in the identified configuration records that may have generated the event, wherein the one or more assets are identified by examining a configuration of assets in an asset database;
        using the set of event-asset associations so generated, cross-referencing a first event-asset association that is associated with a first system, with a second event-asset association that is associated with a second system, the second system being distinct from the first system, to thereby generate cross-referenced event-asset associations for the first and second systems, wherein cross-referencing enables a key management operation to be carried out across the distinct first and second systems collectively as if the first and second systems are integrated with one another;
        based at least on the cross-referenced event-asset associations, deriving a key handle;
        using the key handle to initiate the key management operation; and performing the key management operation for each of the first and second systems as a response to the event.

9. The apparatus as described in claim 8 wherein the first and second systems are first and second application software systems.

10. The apparatus as described in claim 9 wherein each of the first and second application software systems are managed by distinct entities.

11. The apparatus as described in claim 8 wherein the key management operation is one of: generation, establishment, retrieval, revocation and refresh.

12. The apparatus as described in claim 8 wherein the event is one of: an event triggered upon compromise of an entity, and an event triggered upon establishment of a service connection from an entity.

13. The apparatus as described in claim 8 wherein the event is a timed event associated with the maintenance task in the network.

14. The apparatus as described in claim 8 wherein the key management operation is initiated using key management protocol.

15. A computer program product in a non-transitory computer readable medium for use in a data processing system, the computer program product holding computer program instructions which, when executed by the data processing system, perform a method of key management in a network comprising a plurality of nodes, the method comprising:
responsive to occurrence of an event, wherein the event is associated with a maintenance task in the network, generating a set of event-asset associations by identifying one or more configuration records, and identifying one or more assets defined in the identified configuration records that may have generated the event, wherein the one or more assets are identified by examining a configuration of assets in an asset database;
using the set of event-asset associations so generated, cross-referencing a first event-asset association that is associated with a first system, with a second event-asset association that is associated with a second system, the second system being distinct from the first system, to thereby generate cross-referenced event-asset associations for the first and second systems, wherein cross-referencing enables a key management operation to be carried out across the distinct first and second systems collectively as if the first and second systems are integrated with one another;
based at least on the cross-referenced event-asset associations, deriving a key handle;
using the key handle to initiate the key management operation; and
performing the key management operation for each of the first and second systems as a response to the event.

16. The computer program product as described in claim 15 wherein the first and second systems are first and second application software systems.

17. The computer program product as described in claim 16 wherein each of the first and second application software systems are managed by distinct entities.

18. The computer program product as described in claim 15 wherein the key management operation is one of: generation, establishment, retrieval, revocation and refresh.

19. The computer program product as described in claim 15 wherein the event is one of: an event triggered upon compromise of an entity, and an event triggered upon establishment of a service connection from an entity.

20. The computer program product as described in claim 15 wherein the event is a timed event associated with the maintenance task in the network.

* * * * *